Aug. 18, 1942. A. E. BORDEN 2,293,041
APPARATUS FOR FILTERING AND COOLING LIQUIDS
Filed March 28, 1938 2 Sheets-Sheet 1

INVENTOR
A.E. Borden
BY Roy A. Plant
ATTORNEY

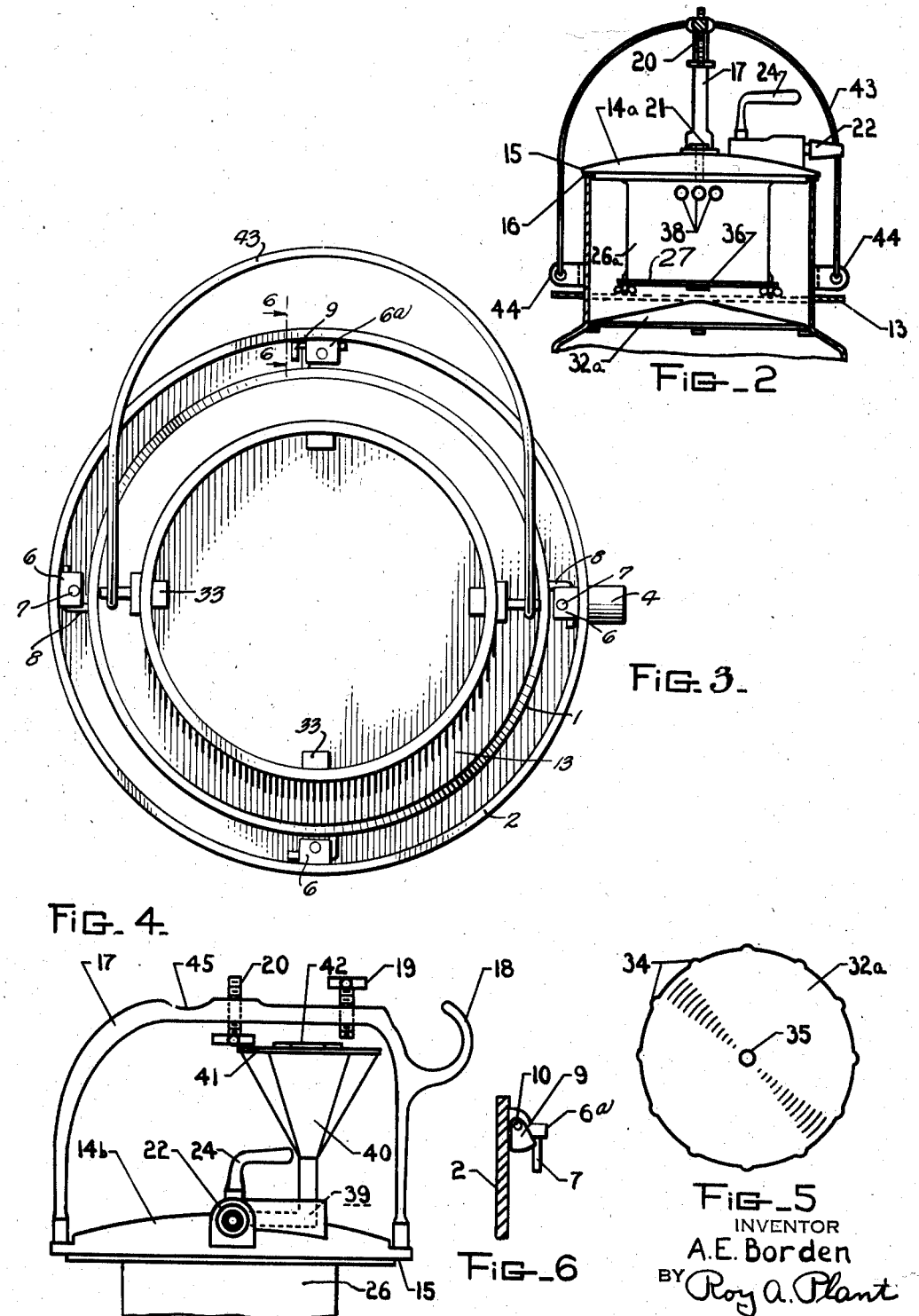

Patented Aug. 18, 1942

2,293,041

UNITED STATES PATENT OFFICE 2,293,041

APPARATUS FOR FILTERING AND COOLING LIQUIDS

Alec E. Borden, Battle Creek, Mich.

Application March 28, 1938, Serial No. 198,390

7 Claims. (Cl. 31—4)

The present invention relates broadly to the filtering and cooling of fluids, and in its specific phases to the filtering and cooling of milk.

Milk given by a healthy cow is in ideal condition for human consumption. It has a satisfactory favorable-bacteria content, while the unfavorable-bacteria content is very low. Two factors enter in converting such milk to an inferior quality. The first of these factors is contamination with foreign matter, and the second is incubation of the unfavorable bacteria. At the temperature that milk is given by a cow, multiplication of bacteria takes place rapidly. According to present standard dairy milking practice, a period of approximately two hours elapses between the time that a cow is milked and the time that the warm milk is cooled in cans in a cooler. This permits extreme multiplication of bacteria, so that there is a relatively high count of bacteria to continue to multiply at a low rate after the milk is cooled. The milk, moreover, is poured from the milk receiving receptacle or pail through a funnel, having a strainer or filter, into milk cans. This transfer under pouring pressure and high agitation tends to drive foreign matter through the filter into the storage milk can. Thus, according to such practice, there is not only contamination of the milk, but multiplication of unfavorable bacteria to a point where the bacteria count is relatively high.

The present-day practice with a milking machine involves milking under vacuum into a milk receiving receptacle which may be carried from cow to cow until almost full, and then the warm milk in the receptacle is emptied into a conventional milk can. These milk cans at the end of the milking period are taken to a cooler, where the temperature of the milk is reduced to retard the rate of bacteria multiplication. The present invention is particularly devised for use in connection with a milking machine and with a view to eliminate some of the factors which cause the production of an inferior quality milk.

Accordingly, among the objects of the present invention is the provision of an apparatus wherein the milk is collected, filtered, and cooled in the same vacuum in a manner eliminating the period of rapid multiplication of bacteria common to the present-day practice.

Another object of the invention is to filter the milk as received from the cow and then cool same.

Another object is to provide a mechanism for filtering the milk under a gentle flow adapted to prevent sediment and foreign matter from being driven through the filter.

Another object is to provide a distributing disc beneath the filter and adapted to deliver the milk to the inner surface of the milk receiving can, where it flows down such surface to the body of milk in the bottom thereof.

Another object is to provide a means for flowing a cooling fluid over a large portion of the outer surface of the milk receiving can in manner causing immediate cooling of the milk delivered thereto.

A further object is to provide a funnel with suitable connections to the space above the filter so that the milk strippings may also be promptly filtered and cooled.

A further object is to provide a drip disc on the outside of the milk receiving receptacle and near the upper end thereof so that where a cooling fluid, such as water, is used, the same will not flow into the milk and contaminate same when the contents of the milk receiving can is being emptied into a milk can or the like.

A still further object is to provide a forced vacuum filtering of the milk before cooling.

Still further objects and advantages will appear as the description proceeds.

To the accomplishment of the foregoing and related ends, the invention, then, consists of the means hereinafter fully described and particularly pointed out in the claims, the annexed drawings and the following description setting forth in detail certain means of carrying out the invention, such disclosed means illustrating, however, but several of various ways in which the principle of the invention may be used.

In said annexed drawings:

Figure 2 shows a partially sectioned vertical view of a modified form of the upper end of the milk receiving can illustrated in Figure 1, but with a perforated side wall filter compartment.

Figure 3 is a top view of the apparatus shown in Figure 1, but with the cover assembly, filter, and distributing disc removed.

Figure 4 is a view corresponding with the upper part of Figure 1, as seen from the right of the latter, drawn on a reduced scale, and showing a modified form of cover assembly with a funnel in addition to the teat-cup hose connection.

Figure 5 shows a top view of the distributing disc shown in edge view in Figure 2.

Figure 1:
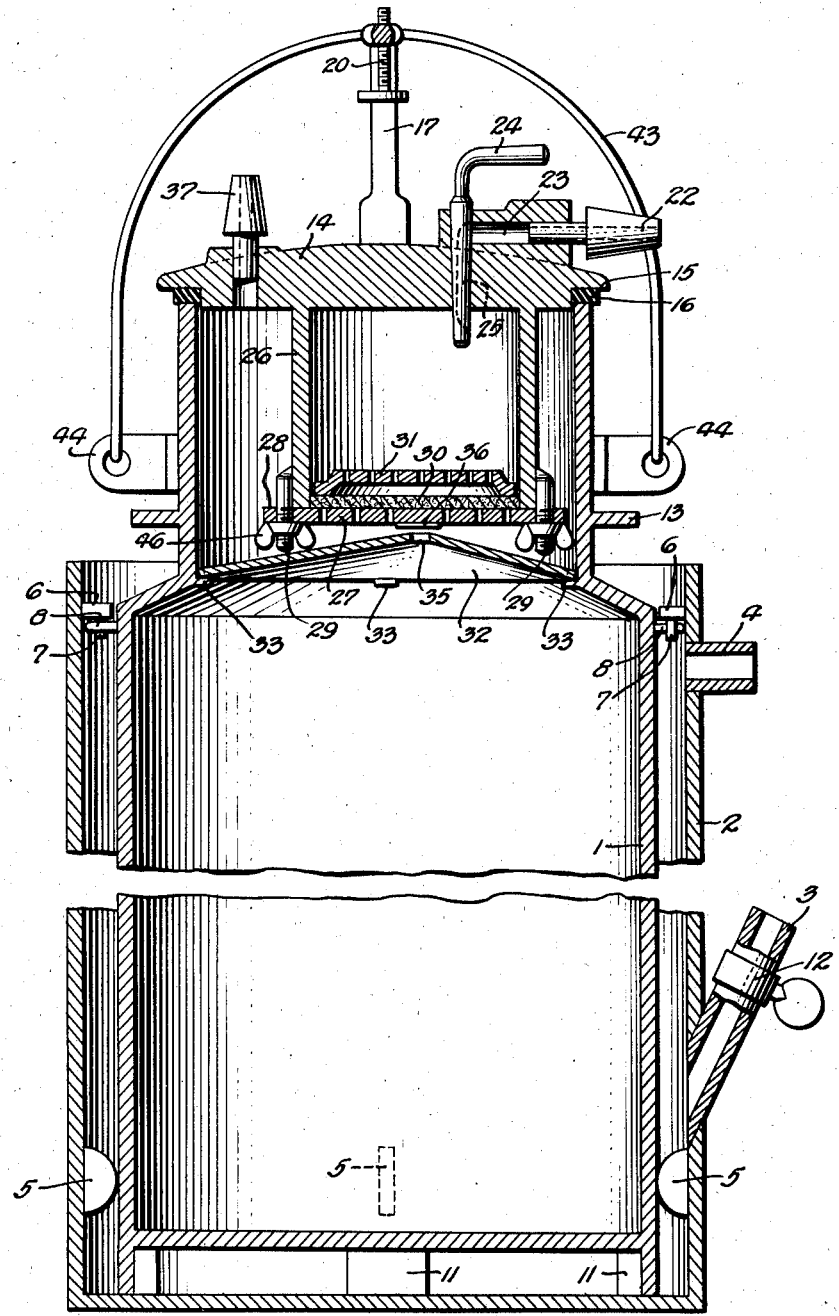
Figure 1 is a vertical sectional assembly view of one form of the invention with imperforate side wall filter compartment.

Figure 6 is an enlarged partially sectioned view taken along the line 6—6 of Figure 3 looking in the direction of the arrows and showing a portion of the cooling receptacle 2 and holding and latching means for a milk can 1.

Referring more particularly to the drawings, a milk receiving can 1 is adapted to be placed in a cooling receptacle 2 which is provided with an inlet 3 and outlet 4 for a suitable cooling fluid, such as cold well water, or even ice water if desired. Spacers 5 on the inside of the cooling receptacle 2 may be used to center the milk receiving can 1 therein. At the upper end of the cooling receptacle 2 is provided a plurality of anchor members 6, each preferably having a downwardly projecting rod 7. The upper end of the milk receiving can 1 is provided at suitable locations with hook-like members 8 adapted to engage three anchor members 6 and one modified anchor member 6a, each carrying a rod 7, all of said anchor members being mounted on cooling receptacle 2 to prevent milk receiving can 1 from floating upward when surrounded by a suitable cooling fluid, such as cold water.

To prevent the milk receiving can 1 from accidentally rotating in manner to cause the unlatching of the hook-like members 8 from the anchor members 6, a suitable lock may be provided. As shown in Figures 3 and 6, such a locking mechanism may consist of a latch bar 9 with a pivot 10 rotatably mounted on the modified anchor member 6a. When the milk receiving can 1 is placed inside of the cooling receptacle 2, the latch bar 9 of the anchor member 6a is rotated upward to allow the hook-like members 8 of the milk receiving can 1 to engage the under faces of anchor members 6 and 6a, whereupon the latch bar 9 is rotated to its lowermost position, where it prevents unlatching rotation of the milk receiving can 1.

To permit free flow of cooling fluid across the bottom of the milk receiving can, such can may be provided on its bottom with legs 11. In order to facilitate the cooling action flow of the cooling fluid, the inlet 3, if desired, may be set at a downward directed angle and may also be provided with a valve 12 for use in shutting off the flow of cooling fluid whenever desired, and particularly when the milk receiving can is to be removed and emptied.

To prevent drippage of cooling water into the milk when the milk receiving can is being emptied, a drip ring 13 is provided on same near the upper end thereof. This causes the water on the outside of the milk receiving can to drip off the edge of the ring when the can is tipped to pouring position.

The upper end of the milk receiving can 1 is closed by means of a cover member 14 (Figure 1) with circumferentially notched edge 15 adapted to receive a gasket 16 for making an air-tight joint with the milk receiving can. Mounted on cover member 14b (Figure 4) is a substantially U-shaped member 17 carrying a teat-cup supporting hook 18. With the De Laval type of apparatus, this substantially U-shaped member 17, which is the same as shown in Figures 1 and 2, is provided with a locking screw 19 for holding the milking pulsator (not shown) in place, while the locking screw 20, which is movable downward for locking purposes, is used for holding the vacuum line connection (not shown) on a mounting member which is hidden behind the upward projecting member which carries inlet connection 22 and valve member 24 (Figure 4). Mounting member 21 (Figure 2) shows in edge view a typical construction on which the vacuum line connnection (not shown) may be mounted and held in place by means of locking screw 20. This mounting member 21 extends upward a short distance above the cover member on which it is installed to facilitate the making of a tight joint with said vacuum line connection. As shown in dotted lines, a central passageway extends through mounting member 21 into the filter compartment therebelow, thus connecting the interior of the milk receiving can 1 to the vacuum system through the vacuum line connector. The milk inlet connection 22 (Figure 1) is joined to the milking teat-cups by a hose (not shown). A suitable passageway 23 leads from the milk inlet connection 22 to a valve member 24 which has a connecting groove 25 leading to filter compartment 26. When the valve member 24 is turned to prescribed location, an open passageway from the milk inlet connection 22 to the interior of milk receiving can 1 is presented. This open passageway may be readily closed by rotating the valve member 24 a prescribed distance, for instance, a quarter turn.

Fastened to the under side of cover member 14 is a filter compartment 26. The lower end of this compartment is closed by means of a perforated plate member 27 which may be provided with ears 28 adapted to releasably engage fastening members 29 which may include wing nuts 45. Above the perforated plate member 27 and inside of filter compartment 26 are placed a filter pad 30, and a strainer plate 31. The use of this strainer plate 31 over the filter pad breaks the force of flow of milk into the filtering compartment under suction conditions, and permits a gentle flow of milk through the filter pad without driving sediment and foreign matter through same. The perforated plate member at the same time supports the filter pad and prevents it from sagging which would facilitate leakage at its edges and an increased tendency to pass foreign matter.

Below the perforated plate member 27 of filter compartment 26 is placed a distributing disc 32. This disc is preferably supported on lugs 33 fastened to the inner edge of the upper end of milk receiving can 1. This distributing disc is adapted to carry the milk delivered from the filter to the inner face of the milk receiving can 1 where it flows down same to the body of milk accumulating in the bottom thereof. To aid in distributing the milk uniformly, the distributing disc may be provided with small projections 34 on the outer circumference thereof, as is shown in Figure 5. The distributing disc is also preferably provided with a vent opening 35 to permit air to flow upward as same is displaced by the milk flowing to the bottom of the milk receiving can. Where such a vent opening is used, it is preferable to provide means for substantially preventing milk dripping therethrough, and a convenient way to accomplish this is to have a plate 36 on the perforated plate member 27 directly over the vent opening 35. This plate 36 is preferably a little larger than the vent opening 35 so that it will prevent milk from dripping directly downward through the vent opening. Whether the vent opening 35 is centrally located on the distributing disc, as shown in Figures 2 and 5, or off-center, as shown in Figure 1, will depend largely upon the location of filter compartment 26 on the under face of cover member 14, and whether a relatively uniform spreading of the milk is to be attained.

The upper portion of the mechanism, as shown in Figure 1, is especially adapted for forced vacuum filtering of milk. The vacuum connection 37 is mounted on the cover member 14 outside of the filter compartment 26, and the latter is of airtight construction except for the milk inlet and filter bottom thereof. The milk delivered to the filter compartment 26 is, accordingly, drawn by vacuum through the strainer plate 31, filter pad 30, and perforated plate member 27, from whence it falls to distributing disc 32.

The combination shown in Figure 2 has a vacuum connection mounting member 21 which communicates with the interior of the filter compartment 26a. To permit free gravity filtering under these conditions, openings 38, or the equivalent, are preferably provided in the upper end of the filter compartment 26a to permit air to flow therethrough into the filter compartment as such air is displaced in the milk receiving can below the filter compartment.

When cows are milked with a milking machine, there is usually between a pint and a quart of milk per cow which, to be obtained from the cow, must be removed by hand milking or stripping. This milk may be poured into an ordinary milk can if desired, but in order to shorten the period of rapid multiplication of bacteria, it is preferable to cool the milk as promptly as possible. To facilitate the handling of this stripped milk in the modified form of apparatus shown in Figure 4, the cover member 14b, corresponding with cover members 14 and 14a, of Figures 1 and 2, respectively, may be provided with a passageway 39 having a funnel 40 connected thereto. This funnel preferably is provided with a cover 41 mounted thereon by means of a hinge 42. By turning valve member 24, passageway 23 (Figure 1) to milk inlet connection 22 (Figures 1 and 4) may be closed, and passageway 39 (Figure 4) leading to funnel 40 opened. Cover 41 on funnel 40 may be turned back on hinge 42 and milk poured through the funnel into the filtering compartment 26, this pouring being facilitated by the vacuum in the milk receiving can. The funnel 40 is preferably made narrow and flat for receiving the poured milk without interfering with the pulsator or vacuum connections. After the stripped milk has been poured through funnel 40 and connecting passageway 39, valve member 24 may be turned to close passageway 39 and either reconnect passageway 23, or close both passageways. Cover 41 would also be closed to prevent dirt from getting into the funnel.

A bail 43 is preferably mounted by means of suitable ears 44 (Figure 1 and 2) on the upper end of milk receiving can 1. This bail 43 is adapted to engage a suitable notch 45, or the like (Figure 4) in U-shaped member 17 to hold cover member 14b with its gasket 16 in air-tight contact with the upper end of milk receiving can 1.

The operation of the mechanism is as follows: With the milk receiving can 1 in place in cooling receptacle 2, as shown in Figure 1, cooling fluid is passed into the cooling receptacle 2 through inlet 3 and out of outlet 4. With the milking machine in operation, milk is drawn through milk inlet connection 22 into filter compartment 26 where it is filtered and flows downward onto distributing disc 32 which delivers the milk in a thin film onto the inner surface of milk receiving can 1 where it flows downward in contact with the cooled surface thereof to an accumulating body of milk in the bottom of the milk receiving can 1. The cooling fluid circulates around the milk receiving can 1 and acts not only to cool the milk as it flows down the inner surface thereof, but also to cool the body of milk in the bottom of the can, preferably to a temperature of 60° F. or lower. This procedure permits rapid cooling of the milk immediately upon removal from the cow being milked, and thus eliminates the period of rapid multiplication of bacteria, and at the same time filters the milk to remove dirt and like contamination.

Other modes of applying the principle of my invention may be employed instead of those explained, changes being made as regards the means herein disclosed, provided those stated by any of the following claims or their equivalent be employed.

I therefore particularly point out and distinctly claim as my invention:

1. In an apparatus of the character described, the combination of a liquid receiving receptacle, a removable cover for said receptacle, means for holding said cover on said receptacle, means for sealing the joint between said cover and receptacle, a vacuum connection on said cover, said vacuum connection communicating with the interior of said receptacle, a filtering compartment on the under face of said cover, a liquid connection on said cover, said liquid connection communicating with the interior of said filtering compartment, a perforated member, means for removably joining same to the liquid outlet of the filtering compartment, a filter means supported by said perforated member, said filter means being at the side of said perforated member facing the interior of said filtering compartment, and a strainer plate mounted over said filter and substantially spaced therefrom over a major portion of the area of the latter.

2. In an apparatus of the character described, the combination of a liquid receiving receptacle, a removable cover for said receptacle, means for holding said cover on said receptacle, means for sealing the joint between said cover and receptacle, a vacuum connection on said cover, said vacuum connection communicating with the interior of said receptacle, a filtering compartment on the under face of said cover, a liquid connection on said cover, said liquid connection communicating with the interior of said filtering compartment, a perforated member, means for removably joining same to the liquid outlet of the filtering compartment, a filter means supported by said perforated member, said filter means being at the side of said perforated member facing the interior of said filtering compartment, a strainer plate mounted over said filter at the inlet side thereof, a removable upstanding substantially conical spreader member with its apex end beneath the outlet from said filter and its base adjacent the inner wall of said receptacle, said spreader member being adapted to have the filtered liquid flow thereover into contact with and down the inner wall of said receptacle, and means for supporting said spreader member.

3. A milk treating device which comprises the combination of a cooling receptacle, a milk receiving can within said cooling receptacle, inlet and outlet connections on said cooling receptacle for passing a cooling fluid through the space between said cooling receptacle and said milk receiving can, means for removably fastening said milk receiving can in said cooling receptacle, a cover for the upper end of said milk receiving can, a filter compartment mounted on the under side of said cover, a filter for milk flowing through said compartment, means for supporting said filter, a milk inlet connection on said cover and adapted for use in delivering milk to the interior of said filter compartment, a vacuum connection on said cover, said vacuum connection communicating with the interior of said milk receiving can outside of said filtering compartment, a substantially conical distributing disc mounted below said filter compartment, the apex of said disc being placed in an upward direction and having an air vent opening therethrough, and means to prevent milk from flowing directly from the filter through the air vent.

4. A milk treating device which comprises the combination of a cooling receptacle, a milk receiving can within said cooling receptacle, inlet and outlet connections on said cooling receptacle for passing a cooling fluid through the space between said cooling receptacle and said milk receiving can in said cooling receptacle, a drip ring on said milk receiving can above the cooling fluid outlet on the cooling receptacle, a cover for the upper end of said milk receiving can, a filter compartment mounted on the under side of said cover, a filter for milk flowing through said compartment, means for supporting said filter, a milk inlet connection on said cover and adapted for use in delivering milk to the interior of said filter compartment, a substantially conical distributing disc mounted below said filter compartment, the apex of said disc being placed in an upward direction and having an air vent opening therethrough, means on the under side of said filter compartment directly over said air vent opening in the distributing disc to prevent milk from flowing directly from the filter through the air vent, a funnel mounted on said cover, and a valve means for connecting said milk inlet and funnel one at a time with said filtering compartment.

5. A milk treating device which comprises the combination of a cooling receptacle, a milk receiving can within said cooling receptacle, inlet and outlet connections on said cooling receptacle for passing a cooling fluid through the space between said cooling receptacle and said milk receiving can, means for removably fastening said milk receiving can in said cooling receptacle, a cover for the upper end of said milk receiving can, a deep filter compartment mounted on the under side of said cover, a filter for milk flowing through said compartment, a supporting means for said filter, a milk inlet connection on said cover and adapted for use in delivering milk to the interior of said filter compartment, a vacuum connection on said cover, said vacuum connection communicating directly with the interior of said filtering compartment at the upper end thereof, vent means connecting said filter compartment, at the upper end thereof, directly with the interior of said milk receiving can, a substantially conical distributing disc mounted below said filter compartment, the apex of said disc being placed in an upward direction and having an air vent opening therethrough, and means to prevent milk from flowing directly from the filter through the air vent.

6. A milk treating device which comprises the combination of a cooling receptacle, a milk receiving can within said cooling receptacle, inlet and outlet connections on said cooling receptacle for passing a cooling fluid through the space between said cooling receptacle and said milk receiving can, means for removably fastening said milk receiving can in said cooling receptacle, a cover for the upper end of said milk receiving can, a filter compartment mounted on the under side of said cover, a milk inlet connection on said cover and adapted for use in delivering milk to the interior of said filter compartment, a filter for the milk passing through said filter compartment, a strainer plate over said filter and substantially spaced therefrom over a major portion of the area of the latter, means for supporting said filter in operative position, a vacuum connection on said cover, a substantially conical distributing disc mounted below said filter compartment, the apex of said disc being placed in an upward direction and having an air vent opening therethrough, and means to prevent milk from flowing directly from the filter through said air vent.

7. A milk treating device which comprises the combination of a cooling receptacle, a milk receiving can within said cooling receptacle, inlet and outlet connections on said cooling receptacle for passing a cooling fluid through the space between said cooling receptacle and said milk receiving can, means for removably fastening said milk receiving can in said cooling receptacle, a drip ring on said milk receiving can above the cooling fluid outlet on said cooling receptacle, a cover for the upper end of said milk receiving can, a filter compartment mounted on the under side of said cover, a filter for milk flowing out of the bottom portion of said compartment, a milk inlet connection on said cover and adapted for use in delivering milk to the interior of said filter compartment, a vacuum connection on said cover, a strainer plate over said filter and substantially spaced therefrom over a major portion of the area of the latter, a removable member supporting said filter, a substantially conical distributing disc mounted below said filter compartment, the apex of said distributing disc being placed in an upward direction and having an air vent opening therethrough, means on the under side of said removable member supporting said filter and directly over said air vent opening in the distributing disc to prevent milk from flowing directly from the filter through the air vent, a funnel mounted on said cover, and a valve means for connecting said milk inlet and funnel one at a time with said filtering compartment.

ALEC E. BORDEN.

CERTIFICATE OF CORRECTION.

Patent No. 2,293,041. August 18, 1942.

ALEC E. BORDEN.

It is hereby certified that error appears in the printed specification of the above numbered patent requiring correction as follows: Page 4, first column, line 27, claim 4, after "can" and before "in" insert the comma and words --, means for removably fastening said milk receiving can --; and that the said Letters Patent should be read with this correction therein that the same may conform to the record of the case in the Patent Office.

Signed and sealed this 17th day of November, A. D. 1942.

Henry Van Arsdale,
(Seal)                 Acting Commissioner of Patents.